United States Patent
Bahrie et al.

(10) Patent No.: US 10,839,000 B2
(45) Date of Patent: Nov. 17, 2020

(54) PRESENTATIONS AND REPORTS BUILT WITH DATA ANALYTICS

(71) Applicant: American Express Travel Related Services Company, Inc., New York, NY (US)

(72) Inventors: Atul Bahrie, New York, NY (US); Jamie Taggart DeYoung, New York, NY (US); Jay Falcon, Phoenix, AZ (US); Hari Krishna Gottipati, Phoenix, AZ (US); Nilesh X Jadhav, Phoenix, AZ (US); Pratap Singh Rathore, Phoenix, AZ (US); Purvi Shah, New York, NY (US); Kelly Velez, New York, NY (US)

(73) Assignee: AMRICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 172 days.

(21) Appl. No.: 15/643,248

(22) Filed: Jul. 6, 2017

(65) Prior Publication Data
US 2019/0012316 A1 Jan. 10, 2019

(51) Int. Cl.
| | |
|---|---|
| G06F 16/00 | (2019.01) |
| G06F 16/20 | (2019.01) |
| G06F 16/26 | (2019.01) |
| G06F 16/25 | (2019.01) |
| G06F 16/38 | (2019.01) |
| G06F 16/34 | (2019.01) |

(Continued)

(52) U.S. Cl.
CPC .......... *G06F 16/38* (2019.01); *G06F 16/2428* (2019.01); *G06F 16/252* (2019.01); *G06F 16/26* (2019.01); *G06F 16/34* (2019.01); *G06F 16/93* (2019.01); *G06Q 10/10* (2013.01); *G06Q 50/01* (2013.01)

(58) Field of Classification Search
CPC ...... G06F 16/00; G06F 16/2428; G06F 16/20; G06F 16/26; G06F 16/252; G06F 16/38; G06F 16/34; G06F 16/93; G06Q 50/01
See application file for complete search history.

(56) References Cited

U.S. PATENT DOCUMENTS

| | | | | |
|---|---|---|---|---|
| 2002/0156787 A1* | 10/2002 | Jameson | ................ | G06Q 10/06 |
| 2008/0148367 A1* | 6/2008 | Hilerio | .................... | G06F 9/453 |
| | | | | 726/5 |

(Continued)

*Primary Examiner* — Charles D Adams
(74) *Attorney, Agent, or Firm* — Thomas | Horstemeyer, LLP

(57) ABSTRACT

A system for generating reports with dynamic business intelligence analytics and/or a static value story may collect parameters defining the scope of a report. The system may select a value story module comprising a set of static report pages for generating the report, and a business insight module comprising a set of dynamic report pages for generating the report. The value story module includes static data related to the scope of the report. The set of dynamic report pages may be generated by a job running on a data storage system. The system may arrange a set of presentation pages into a selected order, with the set of presentation pages being selected from the set of dynamic report pages and the set of static report pages. The system may generate the report in a file format with the report comprising the set of presentation pages in the selected order.

20 Claims, 9 Drawing Sheets

(51) Int. Cl.
*G06F 16/93* (2019.01)
*G06Q 50/00* (2012.01)
*G06F 16/242* (2019.01)
*G06Q 10/10* (2012.01)

(56) References Cited

U.S. PATENT DOCUMENTS

2008/0256429 A1* 10/2008 Penner .................. G06F 17/248
715/200
2012/0023145 A1* 1/2012 Brannon ............... G06F 16/122
707/822

* cited by examiner

FIG. 5

Create Report

Begin Report > Modules > Input Parameters > Delivery Options

Business Insights > Value Stories

Build Your Own Reports | Predefined Reports
Choose from frequently requested reports | Select the modules you want to include ★ FAVORITES 0 | ALL 18 | COMPETITIONS/MARKETPLACE 0 | CUSTOMERS 0 | PERFORMANCE 0

☆ Core Competition Module
Demonstrate a merchant's competitive position through comparing to peer average spend metrics.
☐ SELECT THIS MODULE ☆ Core Competition Module
Demonstrate a merchant's competitive position through comparing to peer average spend metrics.
☑ SELECT THIS MODULE ☆ Core Competition Module
Demonstrate a merchant's competitive position through comparing to peer average spend metrics.
☐ SELECT THIS MODULE ☆ Core Competition Module
Demonstrate a merchant's competitive position through comparing to peer average spend metrics.
☐ SELECT THIS MODULE ☆ Core Competition Module
Demonstrate a merchant's competitive position through comparing to peer average spend metrics.

Your Report ( Next )
Core Performance Module ×
Spend Distributions Module ×
Competitive Peer Averages ×

FIG. 7

PRESENTATIONS AND REPORTS BUILT WITH DATA ANALYTICS

FIELD

This disclosure relates to generating focused presentations by merging business intelligence generated on big data systems with static data.

BACKGROUND

Businesses almost always look to improve relationships with existing customers and expand their customer base. Many organizations provide their customers with statistics on why their products and services help customers achieve their goals. For example, an organization may employ account managers to oversee existing client accounts and pitch to new client accounts. These account managers often carry out their duties by presenting to their assigned clients. The presentations and reports are typically generated by hand for each client. As a result, the data contained in the reports typically goes only as far as the account manager's own creativity, access to data, and ability to crunch numbers. However, the account managers rarely have access to advanced analytics, and in most cases, would not be able to create an analytics process suitable to tailoring data for a specific client report. Big data systems are capable of comparing an entity to a broad array of peers. However, account managers typically lack the ability and access to leverage such systems.

SUMMARY

A system, method, and computer readable medium (collectively, the "system") is disclosed for reports with dynamic business intelligence analytics and/or a static value story. The system may collect parameters defining a scope of a report. The system may select a value story module comprising a set of static report pages for generating the report, and a business insight module comprising a set of dynamic report pages for generating the report. The value story module includes static data related to the scope of the report. The set of dynamic report pages may be generated by a job running on a data storage system. The system may arrange a set of presentation pages into a selected order, with the set of presentation pages being selected from the set of dynamic report pages and the set of static report pages. The system may generate the report in a file format with the report comprising the set of presentation pages in the selected order.

In various embodiments, the data storage system may include a distributed computing cluster. The distributed computing cluster may further include a big data management system. The system may maintain a static presentation inventory comprising a plurality of value story modules with each value story module from the plurality of value story modules comprising a static report page. The system may remove value storage modules from the static presentation inventory in response to a current date being greater than an expiration date of the value storage modules. The report may be generated in a file format suitable for slide presentations. The system may also generate the set of presentation pages in response to input from a user console identifying the set of presentation pages for inclusion in the report.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 5 illustrates an interface for adding value story modules to a value story inventory, in accordance with various embodiments;

FIG. 7 illustrates an interface for selecting business insight modules for execution against a big data storage system to generate report pages containing dynamic data, in accordance with various embodiments;

DETAILED DESCRIPTION

Figure 1:
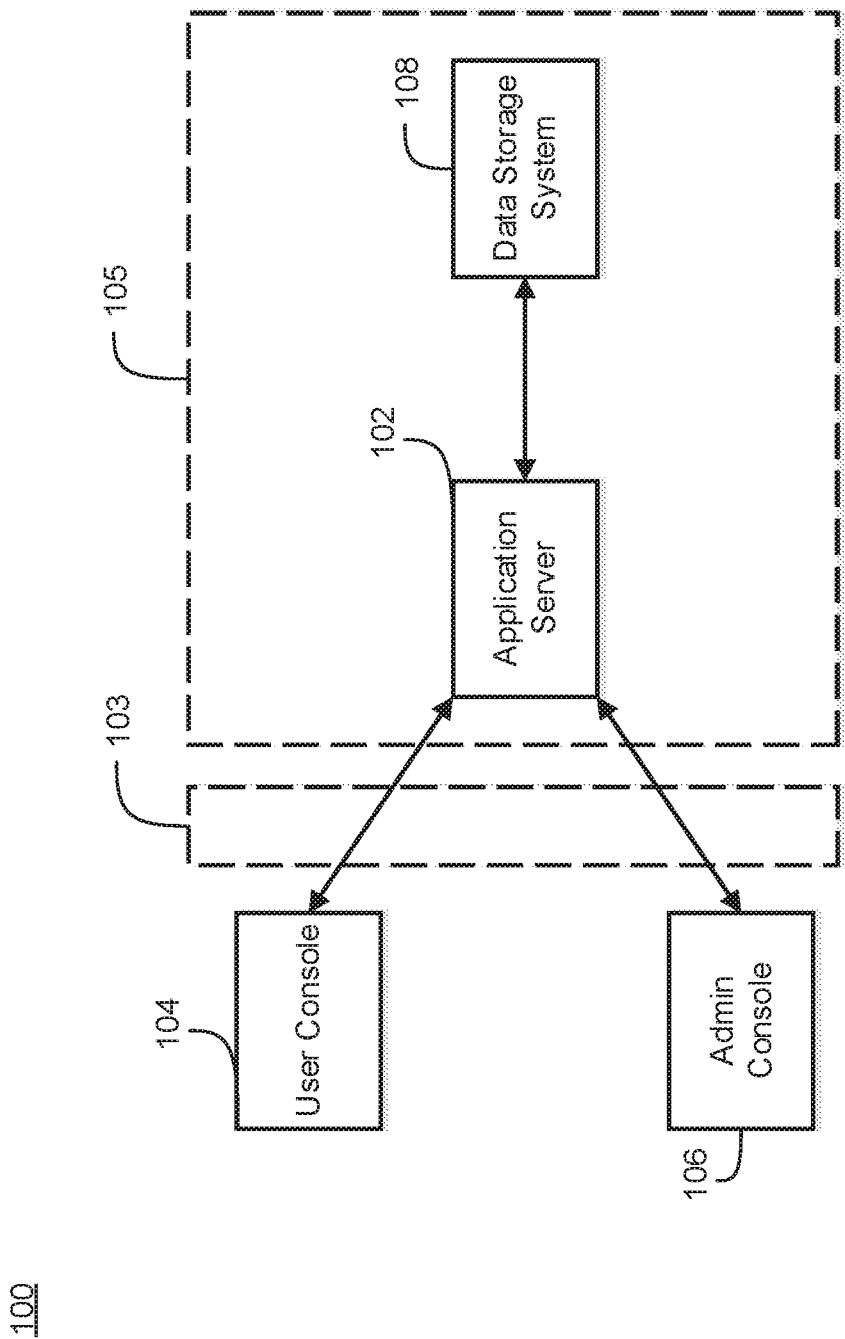
FIG. 1 illustrates a system of computing devices in electronic communication to generate reports with dynamic business intelligence analytics and/or a static value story, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods of the present disclosure allows employees and contractors to generate a customer focused presentation by merging the business intelligence (BI)

reports with the static content used for marketing and campaigns. The static presentation may be uploaded by business units across the globe in various languages for each industry segments and region. The presentations may be split into individual pages. Users running a BI report on big data platforms may select individual slides from a static presentation inventory for inclusion into their final presentation. The system then merges the charts/graph slides (generated by a reporting engine operating on the big data environment) with static slides to create final presentation. The final presentations may be downloaded in a variety of file formats such as, for example, ppt or pdf.

The presentation building tools described herein enable client managers (e.g., employees and/or contractors) to merge the BI report generated using a big data platform in a standard format with a consistent "value story." The value story may be normalized through the use of controlled static content. An administrator may upload a static presentation having marketing information for various industries, segments, regions, and/or customers. After these presentations are uploaded into the system, the presentations may be split into individual slides and/or pages. The value story administrator may create various modules by selecting slides and/or pages based on the applicable industry, region and language. A user may select the modules for inclusion in presentations and reports customized for a particular audience.

In various embodiments, users may access the static content normalizing the value story, as described above, for use in static reports. The users may also merge their value story content with their BI content. Big data services may generate the dynamic BI content to create custom reports containing various data analytics. Suitable data analytics may include charts, graphs, text, and/or subtext providing guidance and/or information related to the analytics and value stories. The BI reports may be submitted to big data report service as a request. The big data report service may run big data tools such as, for example, a spark job on a big data platform. The output of the big data may come in the form of charts and graphs. Such outputs may be generated by a reporting engine such as the one commercially available under the tradename Jaspersoft®. The final output may render in the form of PowerPoint, portable document format, html, or other suitable output formats. While creating the presentation/report, the users may organize the slides/pages as per their own needs to create ready to deliver presentation to customers.

The systems and methods described herein may reduce costs by reducing duplicative effort and reduce the use of outdated material. Employees and contractors may also use the systems and methods described herein to unify their voice with consistent messaging for their customers. As a result, reports and presentations developed using the disclosed systems and methods may improve brand image and value by way of consistency in usage and up-to-date and compliant messaging. Ease of use since the content is exposed through self-service portal and is readily merged with business intelligence reports.

Referring now to FIG. 1, system 100 includes computing devices in electronic communication to generate reports with dynamic business intelligence analytics and/or static value story data, in accordance with various embodiments. System 100 includes an application server 102 in communication with one or more user consoles 104 and/or admin consoles 106. User console 104 and/or admin console 106 may be computing devices incorporating a processor in communication with memory to run a web application and/or native application in communication with application server 102. Application server 102 may also be a computing device. Examples of computing devices described herein may include computers, laptops, desktops, servers, computing clusters, tablets, mobile devices, cloud-computing systems, big-data clusters, or other hardware capable of running applications and/or communicating over network 103. Network 103 may be a wide area network traversing segments of a public network such as the Internet, for example.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein Application server 102 may also communicate electronically with data storage system 108 over network 105. Network 105 may be any of the above mentioned networks. For example, network 105 may be a LAN partially isolated from the internet using security devices such as a firewall. Data storage system 108 may comprise one or more data stores suitable for supporting generation of analytics for dynamic, business insight content. Data storage system 108 may also comprise one or more data stores suitable for storing and retrieving static, value story content.

One skilled in the art will also appreciate that, for security reasons, any databases, data stores, systems, devices, servers or other components of system 100 may consist of any combination of such components at a single location or at multiple locations. Moreover, each database or system component may operate in concert with various suitable security features, such as firewalls, access codes, encryption, decryption, compression, decompression, and the like.

Encryption may be performed by way of any of the techniques now available in the art or which may become available. Examples of viable encryption techniques include Twofish, RSA, El Gamal, Schorr signature, DSA, PGP, PKI, and GPG (GnuPG) as well as other symmetric and asymmetric cryptosystems.

Application server 102 may include application servers (e.g. WEB SPHERE, WEB LOGIC, JBOSS, EDB® Postgres Plus Advanced Server® (PPAS), etc.). Application server 102 may also run software to support web servers (e.g. APACHE, IIS, GWS, SUN JAVA® SYSTEM WEB SERVER) suitable for communication with web browsers running on user consoles 104 and/or admin consoles 106. Application servers may also operate in communication with a distributed file system by way of an application programming interface (API) to communicate with a control node on a distributed file system, as described below, and request business insights.

Figure 2:
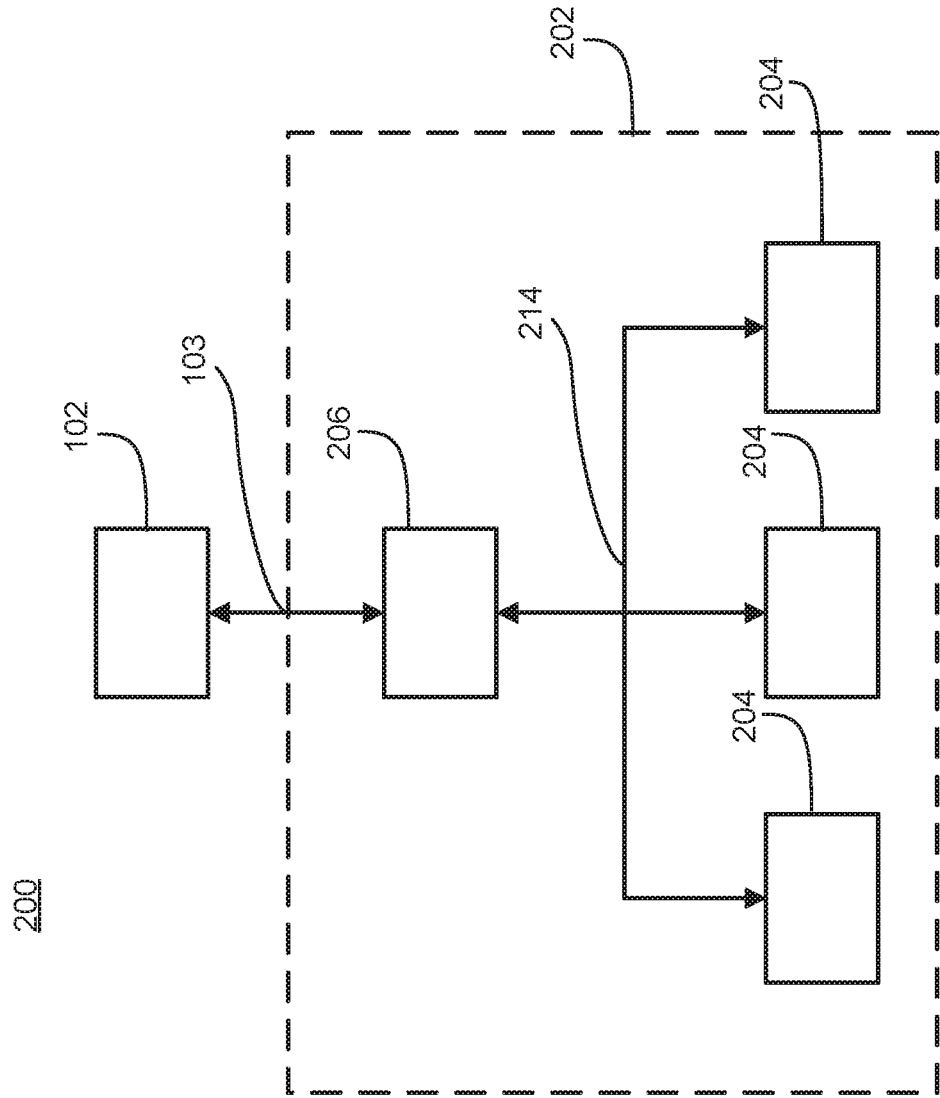
FIG. 2 illustrates a system for storing, reading, and writing big data sets, in accordance with various embodiments.

With reference to FIG. 2, data storage system 110 may be a distributed file system (DFS) 200 as shown, in accordance with various embodiments. DFS 200 comprises a distributed computing cluster 202 configured for parallel processing and storage. Distributed computing cluster 202 may comprise a plurality of nodes 204 in electronic communication with each of the other nodes, as well as a control node 206. Processing tasks may be split among the nodes of distributed computing cluster 202 to improve throughput and enhance storage capacity. Distributed computing cluster may be, for example, a Hadoop® cluster configured to process and store big data sets with some of nodes 204 comprising a distributed storage system and some of nodes 204 comprising a distributed processing system. In that regard, distributed computing cluster 202 may be configured to support a Hadoop® distributed file system (HDFS) as specified by the Apache Software Foundation at http://hadoop.apache.org/docs/.

In various embodiments, nodes 204, control node 206, and an interfacing computing device may comprise any devices capable of receiving and/or processing an electronic message via network 103 and/or network 105. For example, nodes 204 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, a computing device may submit requests to control node 206 for business analytics. For example, an application server 102 may operate using an API to communicate with control node 206. Control node 206 may distribute the tasks among nodes 204 for processing to complete the job intelligently. Control node 206 may limit network traffic and enhance the speed at which incoming data is processed. In that regard, the computing device making a request may be a separate machine from distributed computing cluster 202 in electronic communication with distributed computing cluster 202 via network 103. Nodes 204 and control node 206 may similarly be in communication with one another over network 105. Network 105 may be an internal network isolated from the Internet and user console 104, or, network 105 may comprise an external connection to enable direct electronic communication with user console 104 and the Internet.

In various embodiments, DFS 200 may process hundreds of thousands of records from a single data source. DFS 200 may also ingest data from hundreds of data sources. Nodes 204 may process the data in parallel to expedite the processing. Furthermore, the transformation and intake of data as disclosed below may be carried out in memory on nodes 204. For example, in response to receiving a source data file of 100,000 records, a system with 100 nodes 204 may distribute the task of processing 1,000 records to each node 204. Each node 204 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 3:
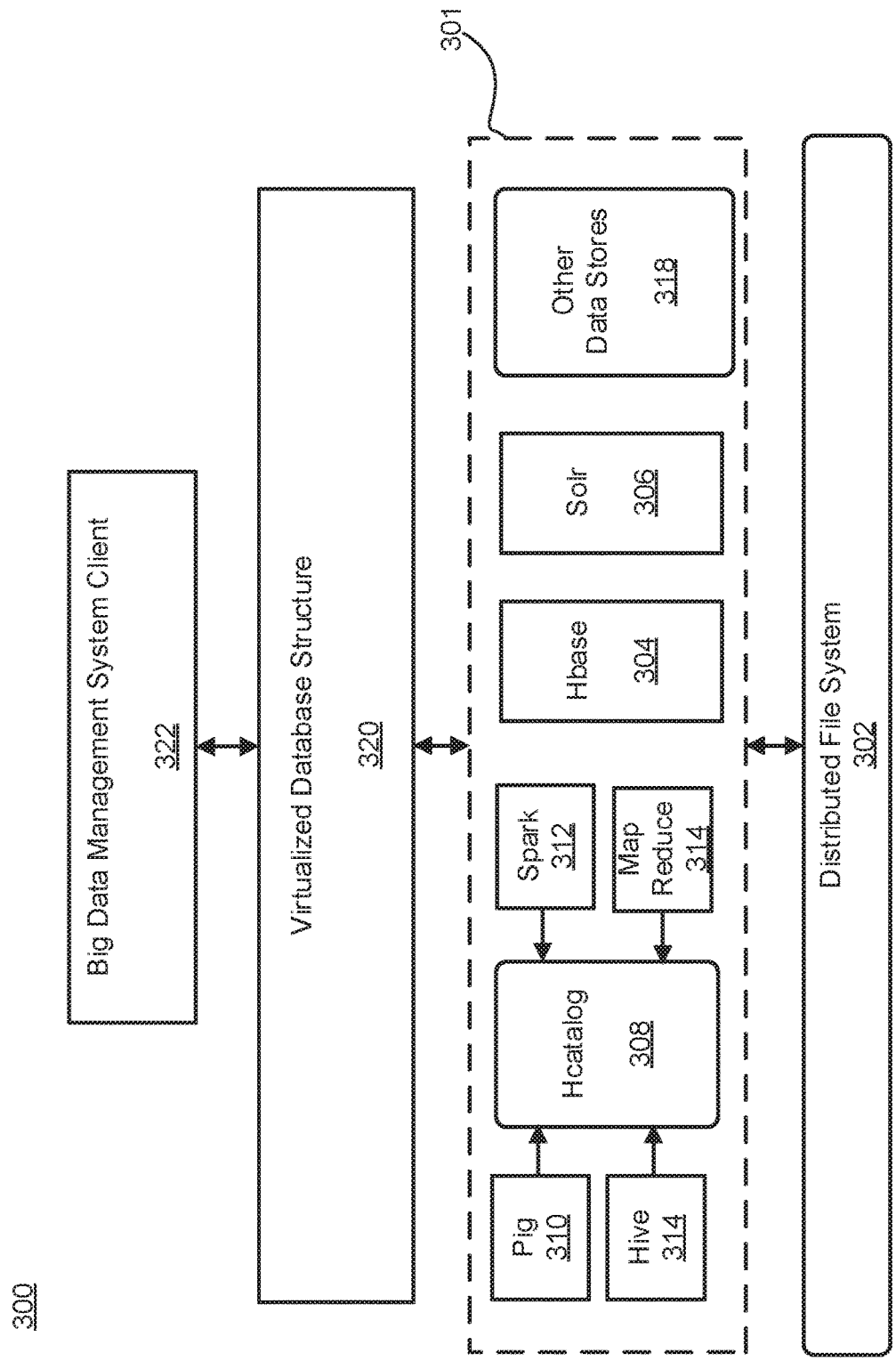
FIG. 3 illustrates a big data management system supporting a unified, virtualized interface for multiple data storage types, in accordance with various embodiments.

With reference to FIG. 3, an exemplary architecture of a big data management system (BDMS) 300 is shown, in accordance with various embodiments. BDMS 300 may be similar to or identical to DFS 200 of FIG. 2, for example. DFS 302 may serve as the physical storage medium for the various data storage formats 301 of DFS 302. A non-relational database 304 may be maintained on DFS 302. For example, non-relational database 304 may comprise an HBase storage format that provides random, real time read and/or write access to data, as described and made available by the Apache Software Foundation at http://hbase.apache.org/.

In various embodiments, a search platform 306 may be maintained on DFS 302. Search platform 306 may provide distributed indexing and load balancing to support fast and reliable search results. For example, search platform 306 may comprise a Solr® search platform as described and made available by the Apache Software Foundation at http://lucene.apache.org/solr/.

In various embodiments, a data warehouse 314 such as Hive® may be maintained on DFS 302. The data warehouse 314 may support data summarization, query, and analysis of warehoused data. For example, data warehouse 314 may be a Hive® data warehouse built on Hadoop® infrastructure. A data analysis framework 310 may also be built on DFS 302 to provide data analysis tools on the distributed system. Data analysis framework 310 may include an analysis runtime environment and an interface syntax such similar to those offered in the Pig platform as described and made available by the Apache Software Foundation at https://pig.apache.org/.

In various embodiments, a cluster computing engine 312 for high-speed, large-scale data processing may also be built on DFS 302. For example, cluster computing engine 312 may comprise an Apache Spark™ computing framework running on DFS 302. DFS 302 may further support a MapReduce layer 316 for processing big data sets in a parallel, distributed manner to produce records for data storage formats 301. For example, MapReduce layer 316 may be a Hadoop® MapReduce framework distributed with the Hadoop® HDFS as specified by the Apache Software Foundation at http://hadoop.apache.org/docs/. The cluster computing engine 312 and MapReduce layer 316 may ingest data for processing, transformation, and storage in data storage formats 301 using the distributed processing and storage capabilities of DFS 302.

In various embodiments, DFS 302 may also support a table and storage management layer 308 such as, for example, an HCatalog installation. Table and storage management layer 308 may provide an interface for reading and writing data for multiple related storage formats. Continuing the above example, an HCatalog installation may provide an interface for one or more of the interrelated technologies described above such as, for example, Hive®, Pig, Spark®, and Hadoop® MapReduce.

In various embodiments, DFS 302 may also include various other data storage formats 318. Other data storage formats 318 may have various interface languages with varying syntax to read and/or write data. In fact, each of the above disclosed storage formats may vary in query syntax and interface techniques. Virtualized database structure 320 may provide a uniform, integrated user experience by offering users a single interface point for the various different data storage formats 301 maintained on DFS 302. Virtualized database structure 320 may be a software and/or hardware layer that makes the underlying data storage formats 301 transparent to client 322 by providing variables on request. Client 322 may request and access data by requesting variables from virtualized database structure 320. Virtualized database structure 320 may then access the variables using the various interfaces of the various data storage formats 301 and return the variables to client 322.

In various embodiments, the data stored using various above disclosed data storage formats 301 may be stored across data storage formats 301 and accessed at a single point through virtualized database structure 320. The variables accessible through virtualized database structure 320 may be similar to a column in a table of a traditional RDBMS. That is, the variables identify data fields available in the various data storage formats 301.

In various embodiments, variables may be stored in a single one of the data storage formats 301 or replicated across numerous data storage formats 301 to support different access characteristics. Virtualized database structure 320 may comprise a catalog of the various variables available in the various data storage formats 301. The cataloged variables enable BDMS 300 to identify and locate variables stored across different data storage formats 301 on DFS 302. Variables may be stored in at least one storage format on DFS 302 and may be replicated to multiple storage formats on DFS 302. The catalog of virtualized database structure 320 may track the location of a variable available in multiple storage formats.

The variables may be cataloged as they are ingested and stored using data storage formats 301. The catalog may track the location of variables by identifying the storage format, the table, and/or the variable name for each variable available through virtualized database structure 320. The catalog may also include metadata describing what the variables are and where the variables came from such as data type, original source variables, timestamp, access restrictions, sensitivity of the data, and/or other descriptive metadata. For example, internal data and/or PII may be flagged as sensitive data subject to access restrictions by metadata corresponding to the variable containing the internal data and/or PII. Metadata may be copied from the storage formats 301 or generated separately for virtualized database structure 320.

In various embodiments, virtualized database structure 320 may provide a single, unified, and virtualized data storage format that catalogues accessible variables and provides a single access point for records stored on data storage formats 301. Client 322 (which may operate using similar hardware and software to application server 102, user console 104, and/or admin console 106 of FIG. 1) may access data stored in various data storage formats 301 via the virtualized database structure 320. In that regard, virtualized database structure 320 may be a single access point for data stored across the various data storage formats 301 on DFS 302.

In various embodiments, virtualized database structure 320 may store and maintain the catalog of variables including locations and descriptive metadata, but virtualized database structure 320 may not store the actual data contained in each variable. The data that fills the variables may be stored on DFS 302 using data storage formats 301. Virtualized database structure 320 may enable read and write access to the data stored in data storage formats 301 without a client system having knowledge of the underlying data storage formats 301.

Figure 4:
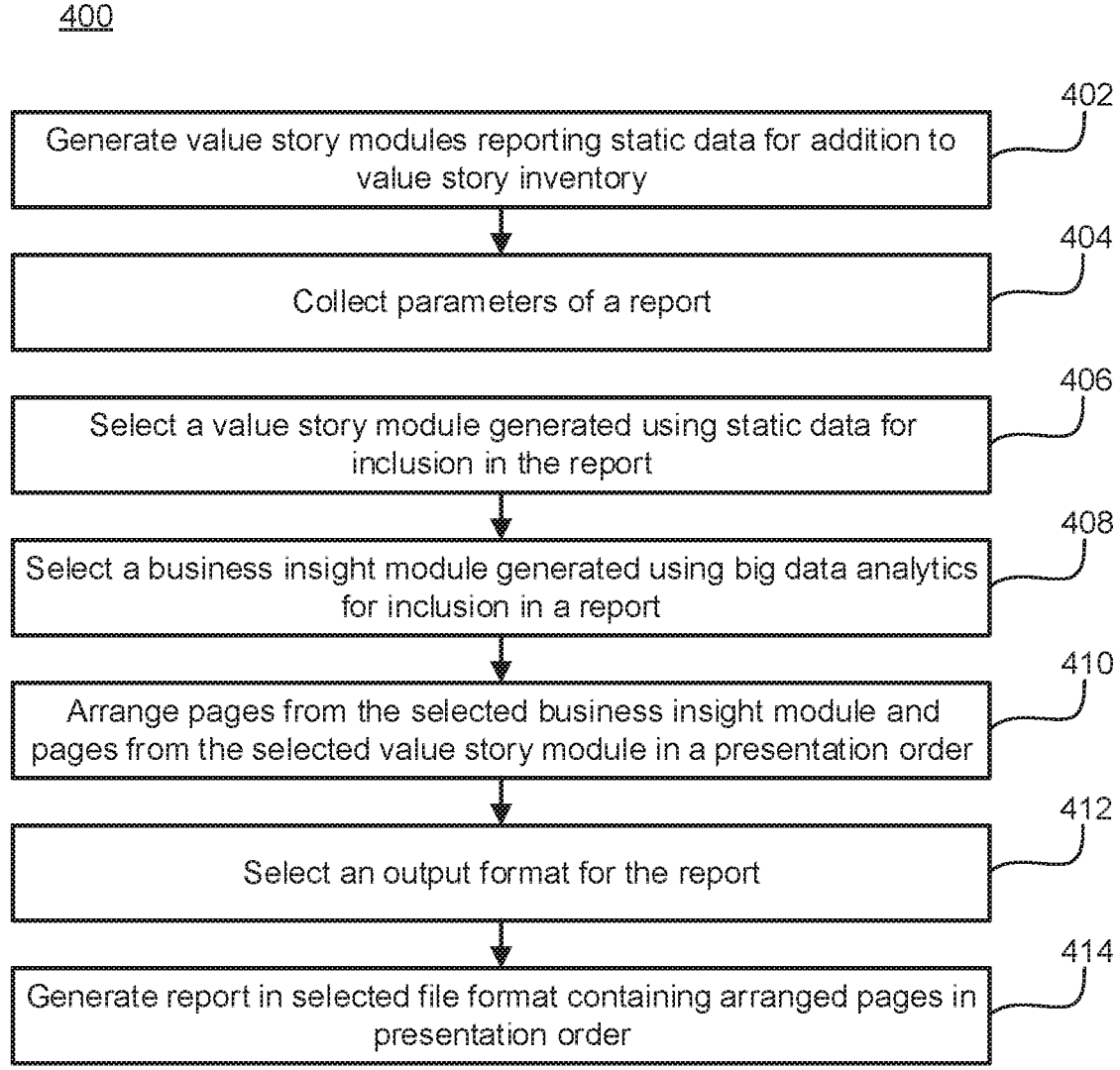
FIG. 4 illustrates a process for generating reports including dynamic business intelligence analytics and/or a static value story, in accordance with various embodiments.

Referring now to FIG. 4, a process 400 is shown for generating reports, in accordance with various embodiments. Process 400 may execute based on inputs and selections made using the various interfaces illustrated for exemplary purposes in FIGS. 5-9. Process 400 enables system 100 operating on behalf of users to merge the BI reports generated using big data platform into a report along with static value story presentations uploaded by users and/or administrators.

Figure 5:
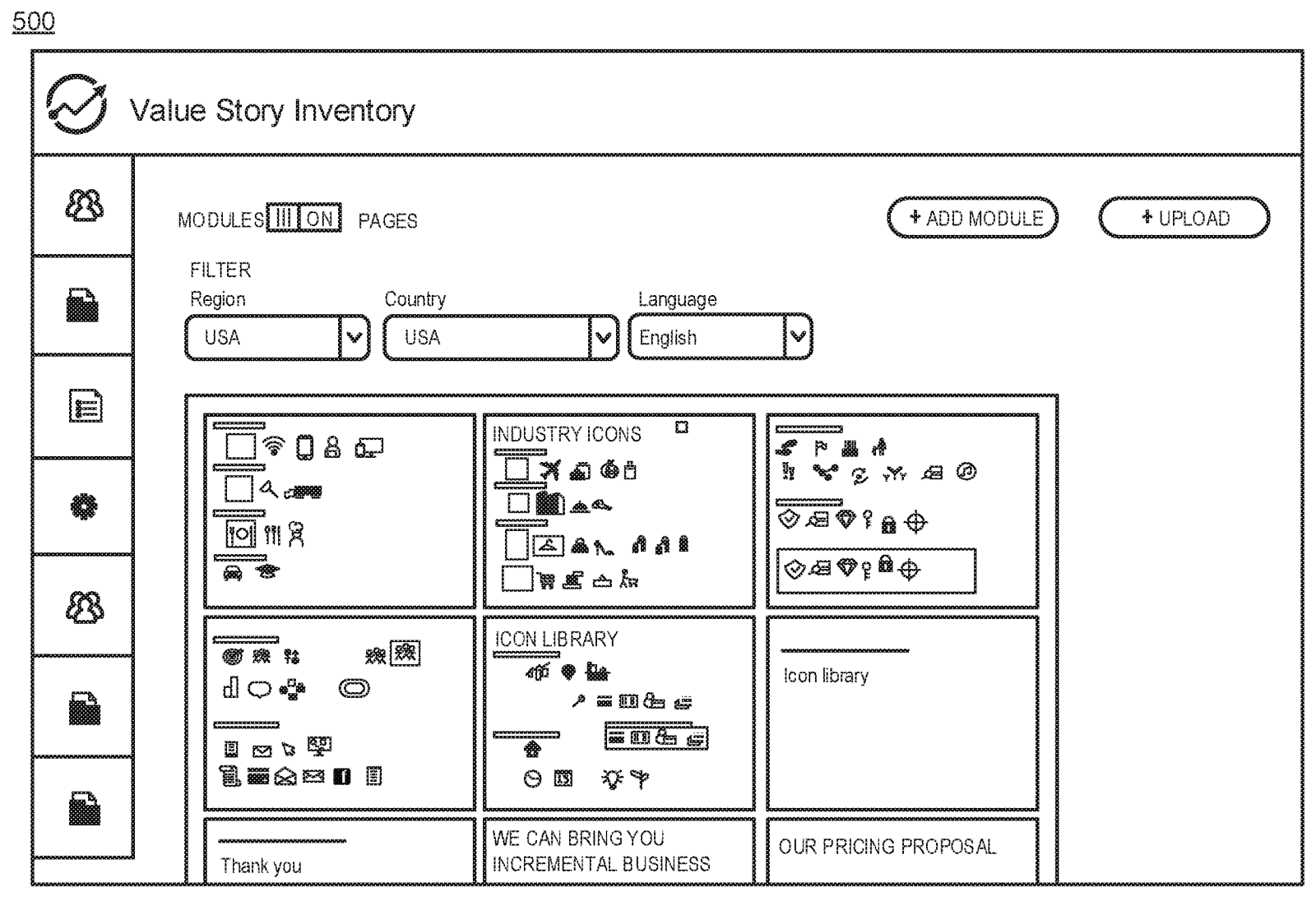

In various embodiments, system 100 may generate and maintain a value story inventory similar to the one illustrated in interface 500 of FIG. 5. User console 104 and/or admin console 106 may upload static presentations having marketing information directed to a particular customer, market segment, or other demographic. For example, the content contained in the static presentations may include suggestions on improving business characteristics such as revenue, costs, marketing exposure, market share, etc. for particular market segments, geographical regions, or even specific customers. Static presentations uploaded into system 100 may be split into individual pages selectable for inclusion and/or movement within a report.

Figure 6:
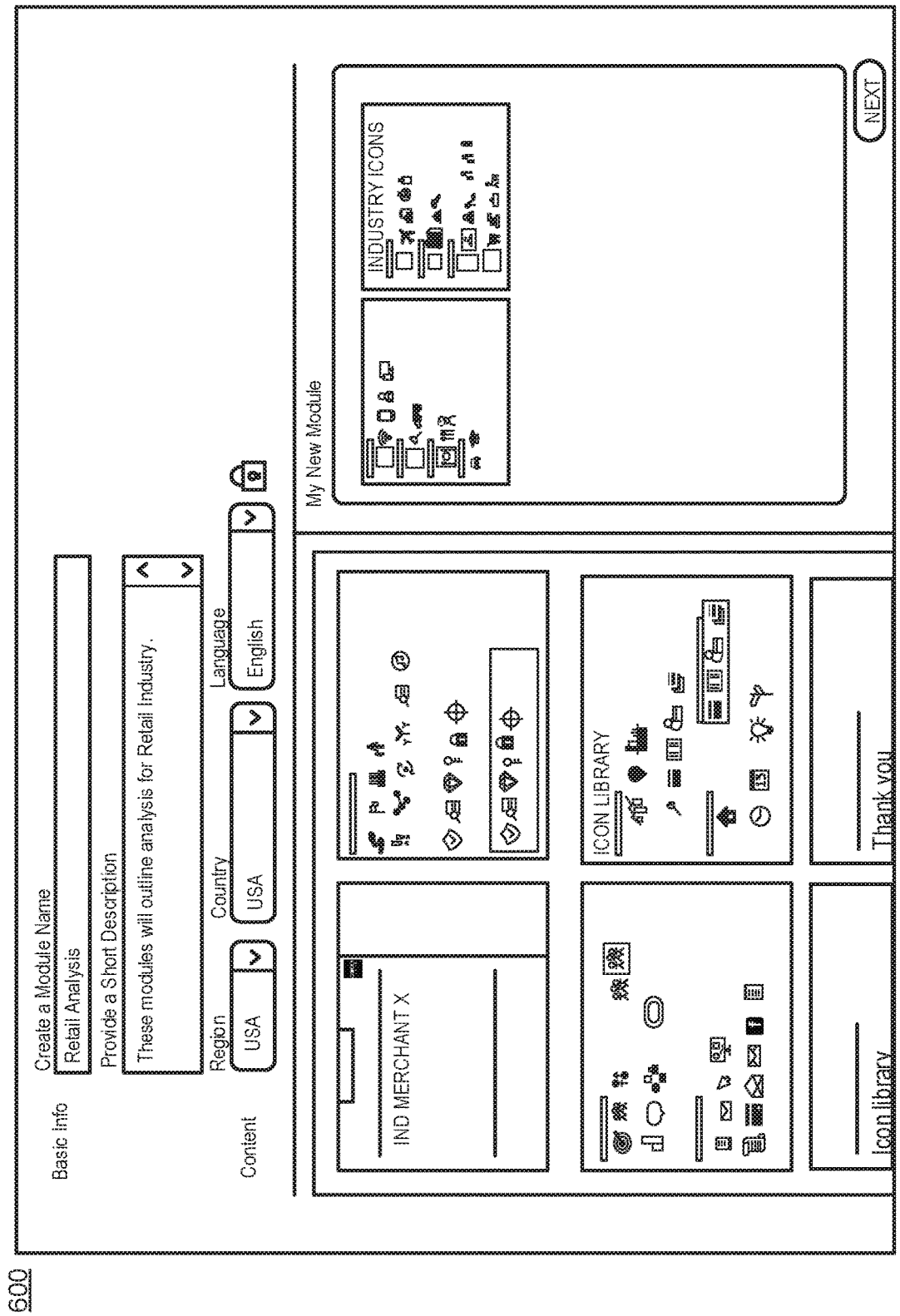
FIG. 6 illustrates an interface for creating value story modules containing static data, in accordance with various embodiments.
Figure 8:
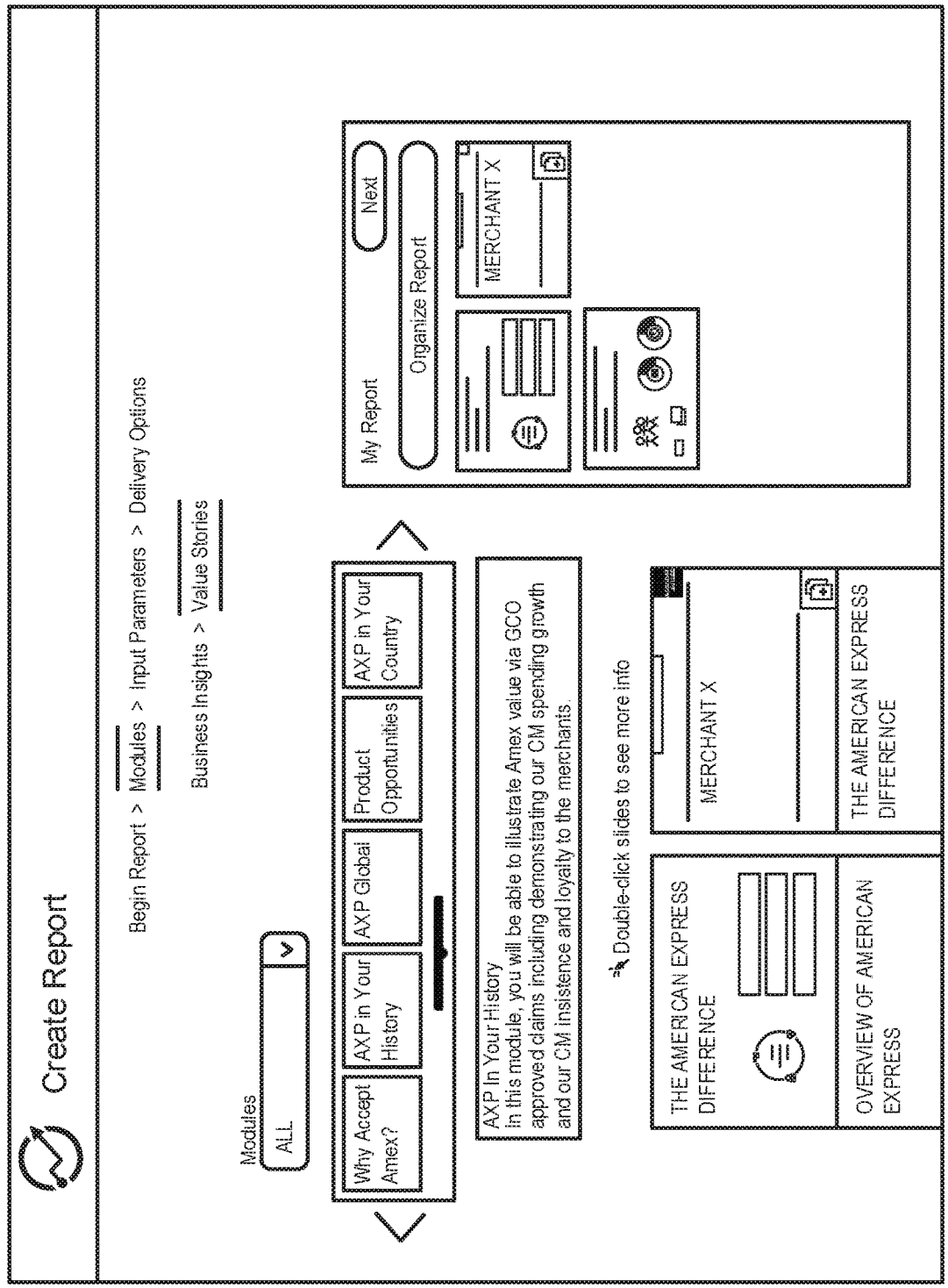
FIG. 8 illustrates an interface for selecting value story modules having static data for inclusion in a report, in accordance with various embodiments.
Figure 9:
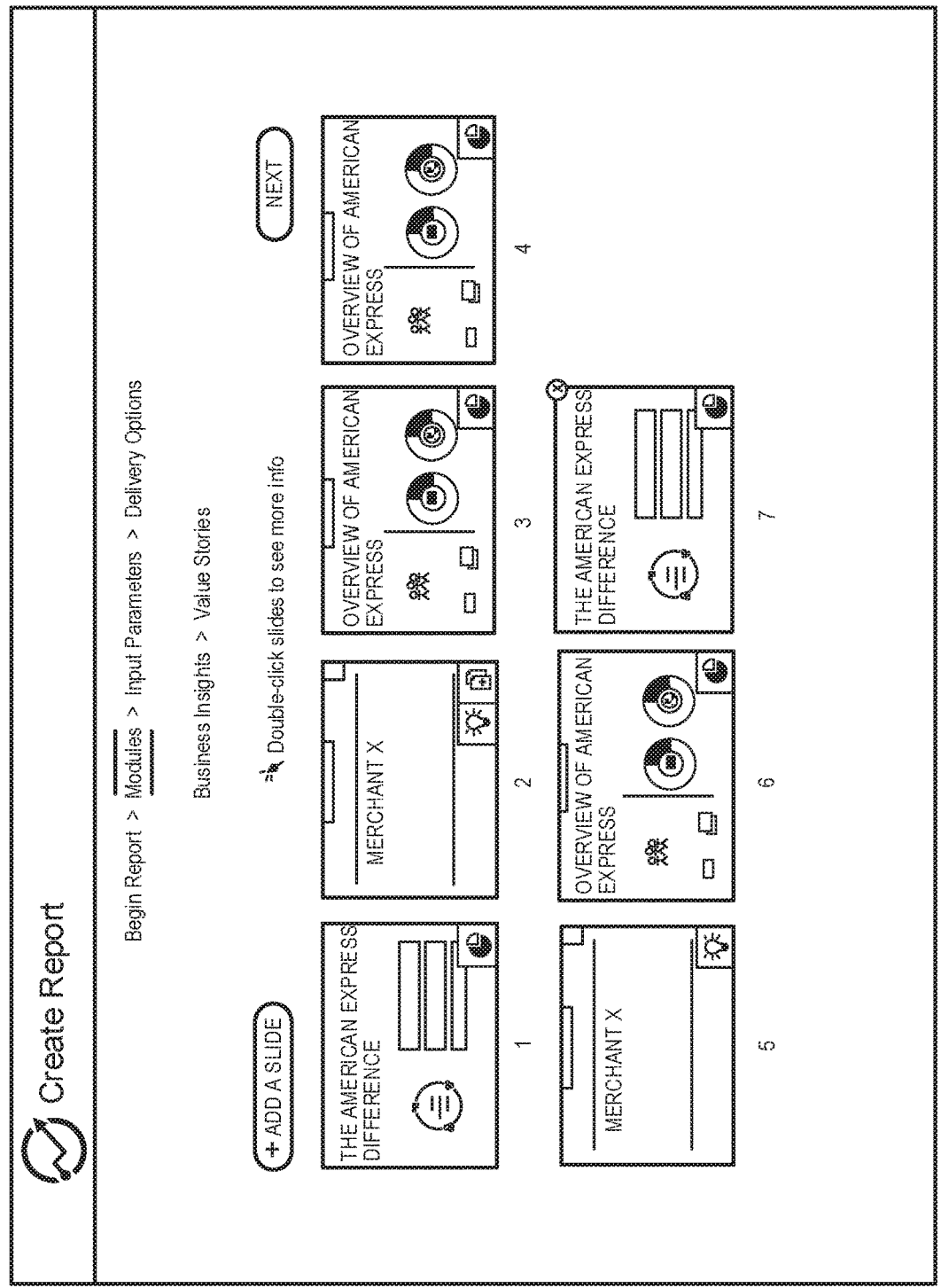
FIG. 9 illustrates an interface for arranging business insight pages with dynamic data and value story pages with static data to generate a report, in accordance with various embodiments.

In various embodiments, an administrator or other user operating via admin console 106 may create modules using the static presentations by selecting pages based on industry, region, and language, for example, to make selectable sets delivering a value story tailored to a market demographic or a customer using an interface for module creation similar to interface 600 of FIG. 6. Users and/or administrators may tag the static reports during the upload and/or during module creation. Tagging may include matching characteristics and demographics describing the target audience to value story modules. Tagging may use prepopulated and selectable lists of characteristics and demographics to enforce uniformity. Users and/or administrators may also set an expiration date for a static report or module to limit the use of stale reports. These static reports having assigned demographics and/or characteristics describing a target audience are also referred to herein as value story modules. System 100 may generate value story modules that report static data for addition to the value story inventory (Block 402). The value story modules may have access controls such that users having a predetermined role or sub role may access appropriate reports. Administrators may assign roles and/or sub roles via admin console 106.

In various embodiments, system 100 may collect parameters for a report (Block 404). The parameters may define the scope of a report for generation. Report parameters may be used to identify modules and pages for inclusion in the report. Report parameters may identify business insights for execution against data from data storage system 108. Report parameters may include a time period, geographic region, report name, customer number, industry segment, prospective customer identifier, a customer group, or other suitable parameters. The user console 104 may also select business insight modules for execution based on the report parameters and other user selections. For example, a user may select a business insight module to demonstrate a customer's competitive position by comparison with peer average spending metrics.

The value stories may be made available for selection by user console 104 for inclusion in specifically tailored reports. System 100 via user console 104 may select a value story module generated using static data for inclusion in the report (Block 406). User console 104 may display an interface similar to interface 800 of FIG. 8 to solicit user input on value story modules for inclusion in a report. The users, to facilitate generation of reports, may select individual pages within the value story module or a complete module for inclusion in the report. Value stories may present pages relating to the customer's relationship with a vendor, the vendor's history, the vendor's global presence, products offered by the vendor, and the vendors geographic footprint, for example. In that regard, the value stories may be adaptable to a variety of customers, industry segments, geographic locations, and languages.

In various embodiments, system 100, via user console 104 in communication with application server 102, may also select one or more business insight modules generated using big data analytics for inclusion in a report (Block 408). System 100 may generate business insights modules with dynamically generated content resulting from running an analytics job on data storage system 108 (e.g., BDMS 300). The business insight module may contain pages custom tailored based on a customer, market segment, geographic region, or other demographics. The business insight module may merge with the value story module during process 400 to create a customized report. User console may display an interface similar to interface 700 of FIG. 7 to solicit user input on business insight modules for inclusion in the report. The output from the analytic job running may render in form of charts, graphs, tables, text, or other suitable output formats a report engine. Examples of business analytics may be the evaluation of revenue over time, costs over time, market share held by a company, comparison to competitors, or other data that varies between different customers. The output from the report engine may be stored in a suitable file format for reporting and further manipulation. Examples of suitable file formats include ppt, pdf, doc, or other file formats capable of storing and reproducing the report. The report may contain pages from a business insight module and/or a value story module in response to selections made at user console 104 and/or admin console 106.

In various embodiments, system 100 may also arrange pages from the selected business insight module and pages from the selected value story module in a presentation order (Block 410) in response to input from user console 104 and/or admin console 106. Arranging pages may include selecting available pages for inclusion and exclusion, re-ordering pages, mixing pages from the modules between one another, or otherwise modifying the pages. Arranging the pages may also include making manual edits to the pages in response to inputs from user console 104 and/or admin console 106. Pages from the modules may be arranged in order using a drag-and-drop interface similar to interface 900 of FIG. 9. Individual slides may also be arranged by selecting an individual slide and making the desired modifications via user console 104 and/or admin console 106.

In various embodiments, system 100 may select an output format for the report (Block 412) in response to an input detected at user console 104 and/or admin console 106. System 100 may also generate report in selected file format containing arranged pages in presentation order (Block 414). Process 400 and system 100 may thus generate tailored reports mixing business insights dynamically calculated with big-data analytics and static value stories.

The disclosure and claims do not describe only a particular outcome of generating reports, but the disclosure and claims include specific rules for implementing the outcome of generating reports and that render information into a specific format that is then used and applied to create the desired results of generating reports, as set forth in *McRO, Inc. v. Bandai Namco Games America Inc.* (Fed. Cir. case number 15-1080, Sep. 13, 2016). In other words, the outcome of generating reports can be performed by many different types of rules and combinations of rules, and this disclosure includes various embodiments with specific rules. While the absence of complete preemption may not guarantee that a claim is eligible, the disclosure does not sufficiently preempt the field of generating reports at all. The disclosure acts to narrow, confine, and otherwise tie down the disclosure so as not to cover the general abstract idea of just generating reports. Significantly, other systems and methods exist for generating reports, so it would be inappropriate to assert that the claimed invention preempts the field or monopolizes the basic tools of generating reports. In other words, the disclosure will not prevent others from generating reports, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache/org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICRO-SOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

Selecting, by a computer-based system and based on parameters defining a scope of a report, a value story module comprising a set of static report pages for generating the report, wherein the value story module includes static data related to the scope of the report; and wherein the set of static report pages includes pages in different languages, for different industry segments, for different markets, for different demographics and for different regions;

tagging, by the computer-based system, the set of static report pages during the selecting of the value story module, wherein the tagging matches prepopulated characteristics and demographics describing a target audience to the value story module;

dividing, by the computer-based system, the set of static report pages into individual pages;

selecting, by the computer-based system, a subset of individual pages of the set of static report pages in response to a first user input;

selecting, by the computer-based system, a business insight module comprising a set of dynamic report pages for generating the report, wherein the set of dynamic report pages is generated with data analytics by a job running on a data platform, and wherein the data analytics include at least one of charts, graphs, text, or subtext providing guidance and information related to the data analytics and the value story;

arranging, by the computer-based system, a set of presentation pages into a selected order, wherein the set of presentation pages is selected from the set of dynamic report pages and the subset of the individual pages of the set of static report pages based on an applicable industry, region and language, the selected order being defined according to at least one second user input received via user interactions with a user interface comprising a first user interface window displaying the subset of the individual pages of the set of static report pages and a second user interface window comprising a preview window for displaying a user-selected arrangement of the subset of the individual pages of the set of static report pages; and generating, by the computer-based system, the report in a file format with the report comprising the set of presentation pages in the selected order.

2. The method of claim 1, wherein the parameters include a time period, geographic region, report name, customer number, industry segment, prospective customer identifier and a customer group.

3. The method of claim 2, wherein the business insight module demonstrates a customer's competitive position by comparison with peer average spending metrics.

4. The method of claim 1, further comprising maintaining, by the computer-based system, the value story module from a plurality of value story modules comprising a static report page.

5. The method of claim 4, further comprising removing a value storage module from a static presentation inventory in response to a current date being greater than an expiration date of the value storage module.

6. The method of claim 1, wherein the file format comprises at least one of a slide presentation, PowerPoint or a portable document format (pdf).

7. The method of claim 1, further comprising generating, by the computer-based system, the set of presentation pages in response to input from a user console identifying the set of presentation pages for inclusion in the report.

8. The method of claim 1, wherein the value story module presents pages relating to a customer relationship with a vendor, a history of the vendor, a global presence of the vendor, products offered by the vendor, and a geographic footprint of the vendor.

9. The method of claim 1, further comprising setting, by the computer-based system, an expiration data for the value story module.

10. The method of claim 1, further comprising setting, by the computer-based system, access controls for the value story module.

11. The method of claim 1, wherein the business insight module contains the pages that are custom tailored based on a customer, market segment, geographic region, or demographic.

12. The method of claim 1, wherein the data analytics includes at least one of evaluations of revenue over time, costs over time, market share held by a computer, comparison to competitors, or data that varies between different customers.

13. A computer-based system, comprising:

a processor; and a tangible, non-transitory memory configured to communicate with the processor, the tangible, non-transitory memory having instructions stored thereon that, in response to execution by the processor, cause a computer-based system to perform operations comprising:

selecting, by the computer-based system and based on parameters defining a scope of a report, a value story module comprising a set of static report pages for generating the report, wherein the value story module includes static data and value story inventory related to the scope of the report, and wherein the set of static report pages includes pages in different languages, for different industry segments, for different markets, for different demographics and for different regions;

tagging, by the computer-based system, the set of static report pages during the selecting of the value story module, wherein the tagging matches prepopulated characteristics and demographics describing a target audience to the value story module;

dividing, by the computer-based system, the set of static report pages into individual pages;

selecting, by the computer-based system, a subset of individual pages of the set of static report pages in response to a first user input;

selecting, by the computer-based system, a business insight module comprising a set of dynamic report pages for generating the report, wherein the set of dynamic report pages is generated with data analytics by a job running on a data platform; and wherein the data analytics include at least one of charts, graphics, text, or subtext providing guidance and information related to the data analytics and the value story;

arranging, by the computer-based system, a set of presentation pages into a selected order, wherein the set of presentation pages is selected from the set of dynamic report pages and the subset of the individual pages of the set of static report pages based on an applicable industry, region and language, the selected order being defined according to at least one second user input received via user interactions with a user interface comprising a first user interface window displaying the subset of the individual pages of the set of static report pages and a second user interface window comprising a preview window for displaying a user-selected arrangement of the subset of the individual pages of the set of static report pages; and generating, by the computer-based system, the report in a file format with the report comprising the set of presentation pages in the selected order.

14. The system of claim 13, wherein, when executed, the instructions further cause the computer-based system to perform operations comprising:

generating, by the computer-based system, the set of presentation pages in response to input from a user console identifying the set of presentation pages for inclusion in the report.

15. An article of manufacture including a non-transitory, tangible computer readable storage medium having instructions stored thereon that, in response to execution by a computer-based system, cause the computer-based system to perform operations comprising:

selecting, by the computer-based system and based on parameters defining a scope of a report, a value story module comprising a set of static report pages for generating the report, wherein the value story module includes static data and value story inventory related to the scope of the report, and wherein the set of static report pages includes pages in different languages, for different industry segments, for different marks, for different demographics and for different regions;

tagging, by the computer-based system, the set of static report pages during the selecting of the value story module, wherein the tagging matches prepopulated characteristics and demographics describing a target audience to the value story module;

dividing, by the computer-based system, the set of static report pages into individual pages;

selecting, by the computer-based system, a subset of individual pages of the set of static report pages in response to a first user input;

selecting, by the computer-based system, a business insight module comprising a set of dynamic report pages for generating the report, wherein the set of dynamic report pages is generated with data analytics by a job running on a data platform, and wherein the data analytics include at least one of charts, graphs, text, or subtext providing guidance and information related to the data analytics and the value story;

arranging, by the computer-based system, a set of presentation pages into a selected order, wherein the set of presentation pages is selected from the set of dynamic report pages and the subset of the individual pages of the set of static report pages based on an applicable industry, region, and language, the selected order being defined according to at least one second user input received via user interactions with a user interface comprising a first user interface window displaying the subset of the individual pages of the set of static report pages and a second user interface window comprising a preview window for displaying a user-selected arrangement of the subset of the individual pages of the set of static report pages; and generating, by the computer-based system, the report in a file format with the report comprising the set of presentation pages in the selected order.

16. The article of claim 15, wherein the parameters include a time period, geographic region, report name, customer number, industry segment, prospective customer identifier and a customer group.

17. The article of claim 15, further comprising maintaining, by the computer-based system, a static presentation inventory comprising a plurality of value story modules with the value story module from the plurality of value story modules comprising a static report page.

18. The article of claim 17, further comprising removing a value storage module from the static presentation inventory in response to a current date being greater than an expiration date of the value storage module.

19. The article of claim 15, wherein the file format comprises at least one of a slide presentation, PowerPoint or a portable document format (pdf).

20. The article of claim 15, further comprising generating, by the computer-based system, the set of presentation pages in response to input from a user console identifying the set of presentation pages for inclusion in the report.

* * * * *